INVENTORS
EWALD HEIN &
WALTER KRÄMER
BY
THEIR ATTORNEY

INVENTORS
EWALD HEIN &
WALTER KRÄMER
BY
THEIR ATTORNEY

United States Patent Office 3,396,617
Patented Aug. 13, 1968

3,396,617
ROTARY SHEAR FOR CROPPING AND SUB-
DIVIDING MOVING ROLLED MATERIAL
Ewald Hein, Kreuztal, and Walter Kramer, Dahl-
bruch, Germany, assignors to Siegener Maschinen-
bau G.m.b.H., a corporation of Germany
Filed June 1, 1966, Ser. No. 554,604
Claims priority, application Germany, June 4, 1965,
S 97,478
5 Claims. (Cl. 83—310)

ABSTRACT OF THE DISCLOSURE

A rotary shear for cropping and subdividing moving rolled stock is disclosed. Counter rotating knives are arranged on knife holders having one end mounted on the crank pins of driving crankshafts and their other end mounted on the crank pin of a parallel guide crankshaft, synchronized with the driving crankshafts. By this arrangement the approach roller table and the delivery roller table come close to the circular path of the bottom knife.

---

In rotary shears for cropping and subdividing moving rolled material, it is known to arrange the knives on the knife holders carried each by a driving crankshaft and a parallel guide crankshaft. In connection therewith the driving crankshaft and the parallel guide crankshaft are positively connected through a synchromesh gear system.

According to prior art, the driving crankshaft and the parallel guide crankshaft are mounted in the shear frame in a horizontal or in an inclined plane. It is also known with such shears to arrange the driving crankshafts and the parallel guide crankshafts in the shear frame in a vertical plane on top of one another. Both known embodiments, however, have certain drawbacks. In the first-mentioned shear design, namely, the approach roller table can be brought up only as far as the largest circular crank radius of the parallel guide crankshaft whereby the last roller of the approach roller table is at a considerable distance from the shear knives. Guide plates, which indeed can be moved only as far as in front of the circular path of the knives or knife holders, do not furnish adequate support for the rolled stock. In this case relatively wide gaps still remain unbridged, so that short remaining pieces cannot be conveyed through the shear.

With the shear construction having vertically disposed cranks, it is possible to bring the approach roller table close to the shear knives, but such a shear is built so high that it must be set up in a foundation pit in order to bring the cutting plane to the level of the feed line of the rolled material. In this case, furthermore, the center of mass is relatively high, resulting in an unquiet or noisy run of the shear. Also, with this known shear, the remaining gap between the approach roller table and the delivery roller table cannot be bridged, so that here, too, short end-pieces cannot be passed through the shear.

The invention intends to eliminate these drawbacks. It is therefore based on the object of creating a rotary shear which, on the one hand, makes it possible to move the rolled stock close to the shear knives and in which, on the other hand, the gap between the approach roller table and the delivery roller table can each time be bridged between two cuts such, that the passing of short lengths of rolled material and end-pieces through the shear can occur without difficulties. A further object resides in the fact of bridging the gap between the approach roller table and the delivery roller table in such a manner that on the structural parts provoking the bridging, there occurs the slightest possible, i.e., practically negligible wear. These objects are obtained essentially by a cylindrical or drum body rotating with the crankshaft driving the bottom knife, the shell of said drum having a cutout which allows the bottom knife to emerge out of the drum periphery into the cutting position and submerge from the cutting position into the drum periphery.

Through this measure, the gap between the approach roller table and the delivery roller table is left open only during performance of the cut; whereas, otherwise, this gap is completely bridged by the shell surface of the drum body.

Unobstructed transportation of the rolled material through the shear is, according to the invention, achieved especially through the fact that the drum body has a radius corresponding to the axial distance between the driving crankshaft and the roller table plane.

An especially simple and practical setup of a rotary shear, according to the invention, results in the fact that the drum body is held on one side through a correspondingly shaped support on a crank web of the driving crankshaft. In this regard, too, it is important for the drum body to be developed open on one side and that from this side the cutter head of the knife holder engages into the drum body.

The invention will be explained in greater detail in connection with one embodiment thereof represented in the following drawings of which:

Figure 2:
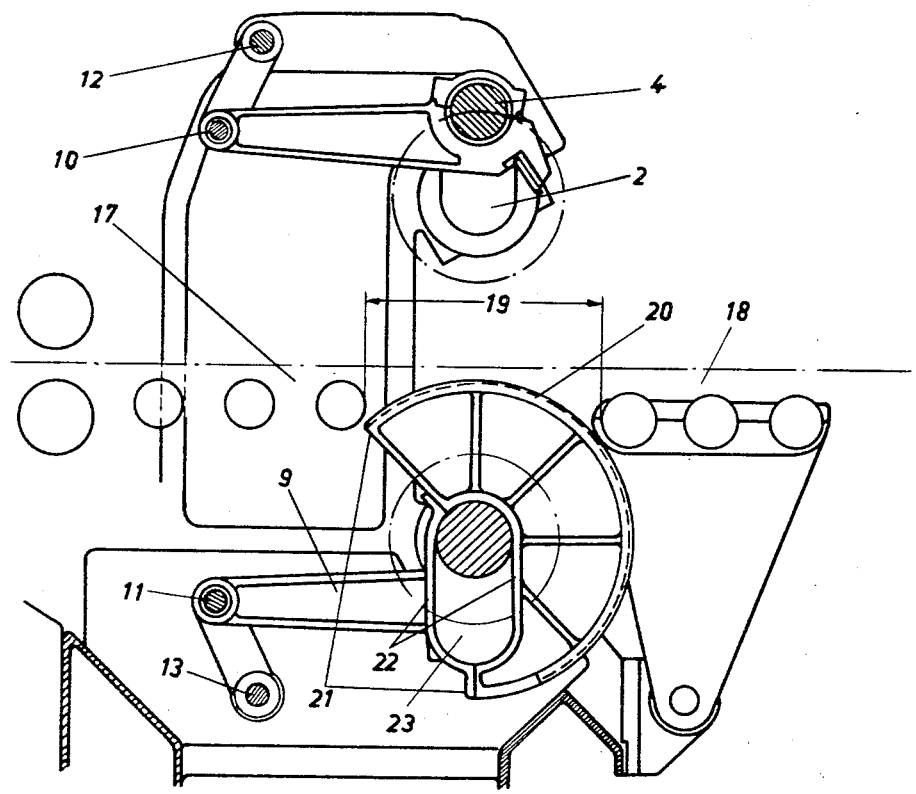
FIGURE 2 is a view similar to FIGURE 1 illustrating the knives in their starting position.

With reference to the drawings, it will be noted that pivotally mounted in a stand 1 of a rotary shear in a vertical plane above one another are two drive crankshafts 2 and 3, each of which has a crank pin 4 and 5. Mounted on each one of these crank pins 4 and 5 is a cutter head 6 and/or 7 of a knife holder 8 and/or 9. The other end of these knife holders 8 and/or 9 is resting on crank pins 10 and/or 11 of parallel guide crankshafts 12 and 13, likewise mounted in the shear stand 1. The parallel guide crankshafts 12 and 13 are arranged in the shear stand 1 such that the planes determined each time by the axis of rotation of the drive crankshaft 2 and/or 3 and the axis of rotation of the parallel guide crankshaft 12 and/or 13 associated with the latter and therewith the knife holders 8 and 9 as related to the plane of motion of the rolled stock 14 are inclined. The cutting line of these inclined planes is on the runout side of the shear. Fastened to each cutter head 6 and/or 7 of the knife holders 8 and 9 is a knife 15 and/or 16, whereby the cutting plane of the knives 15 and 16 proceeds through the axes of rotation of the drive crankshafts 2 and 3. As noted above, FIGURE 2 illustrates the operative position of the knives. The feeding of the rolled material to be cut 14 occurs through an approach roller table 17 while the cutoff partial sections of the rolled material 14a are removed by a runout roller table 18.

Between the last roll 17a of the approach roller table 17 and the first roll 18a of the delivery roller table 18 is a gap 19 to let the bottom knife 16 pass through during execution of the cutting stroke. The length of this gap 19 is dependent on the largest crank radius of the driving crankshaft 3. The length of the gap is most of the time so great that the crop ends and the remaining pieces of the rolled material still left after the final cut can drop off into the gap. Jamming of the pieces of rolled stock in the zone of the shear can thereby occur easily and operating interruptions, if not even breakdowns on the shear, are the result thereof. The removal of the jammed pieces and therewith the elimination of the operating interruptions is cumbersome and time consuming.

To avoid these difficulties, a drum body 20 is associated with the drive crankshaft 3 for the bottom knife holder 9 which rotates together wtih said drive crankshaft 3. This drum body has a radius corresponding to the axial distance between the drive crankshaft 3 and the roller table plane and it is provided with a shell cutout 21 through which, when executing the cut, the bottom knife 16 can emerge above the drum periphery and it can also submerge in the drum periphery after the cut has been executed.

Figure 3:
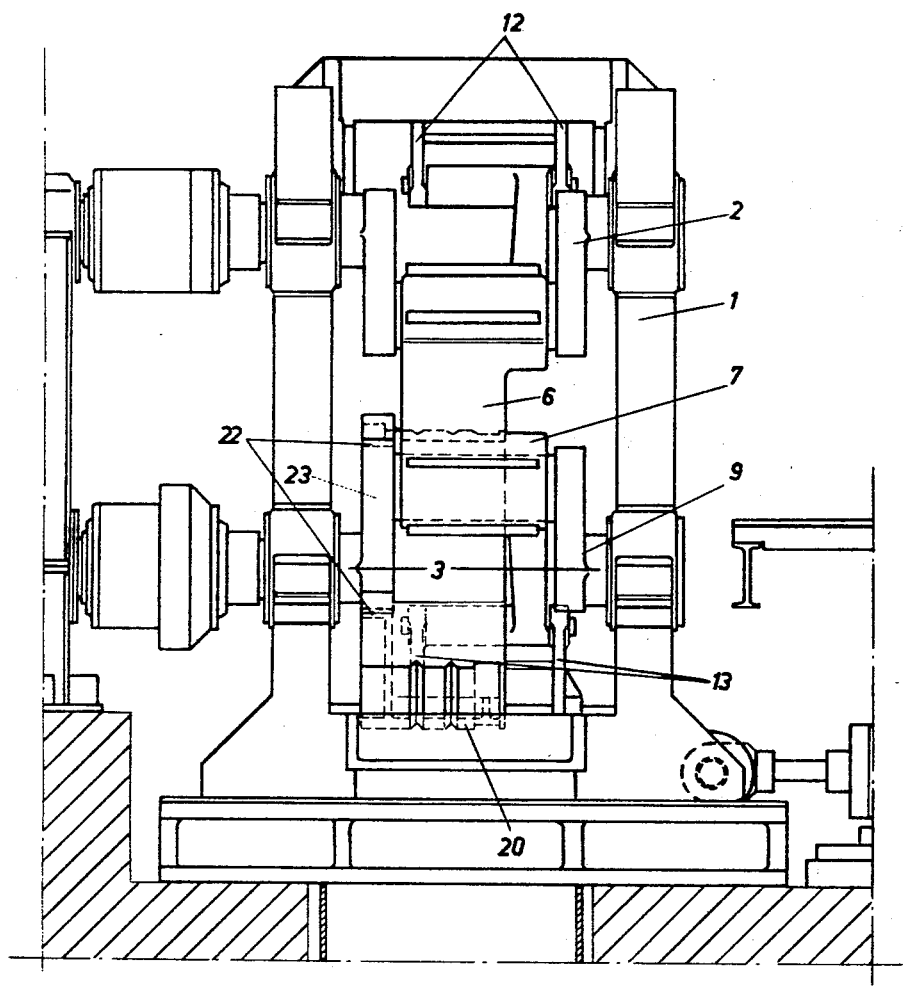
FIGURE 3 is a second elevational view of the shear shown in FIGURES 1 and 2.

As can be seen, especially in FIGURE 3, the drum body 20 is on one side held by a suitably shaped support 22 on a crank web 23 of the driving crankshaft 3 and carried along by the latter while turning. In connection therewith the drum body is at one end developed open, and from this open side the cutter head 7 of the knife holder 9 engages into the drum body 20. In the starting position of the shear the drum body 20, as can be plainly seen in FIGURE 2, assumes a position such that its shell completely bridges the gap 19 between the two roller tables 17 and 18, thereby preventing the rolled stock 14 from penetrating into this gap. With the start of the shear from the position according to FIGURE 2, the drum body 20 is forcibly carried along by the crank web 23 (see FIGURE 3) through its support 22, i.e., it turns at the same speed as the driving crankshaft 3 for the bottom knife holder 9. During the turning of the drive crankshaft 3 the cutter head 7 with the bottom knife 16, in the staring position according to FIGURE 2 and enclosed by the drum body 20, emerges gradually from the shell cutout 21 of the drum body 20 in such a manner that with the execution of each cut, it assumes in relation to the drum body 2 the position indicated in FIGURE 1. After execution of the cut, the cutter head 7 with the bottom knife 16 again submerges in the periphery of the drum body 20 while at the same time the shell surface of the latter again forcibly bridges the gap 19.

Figure 1:
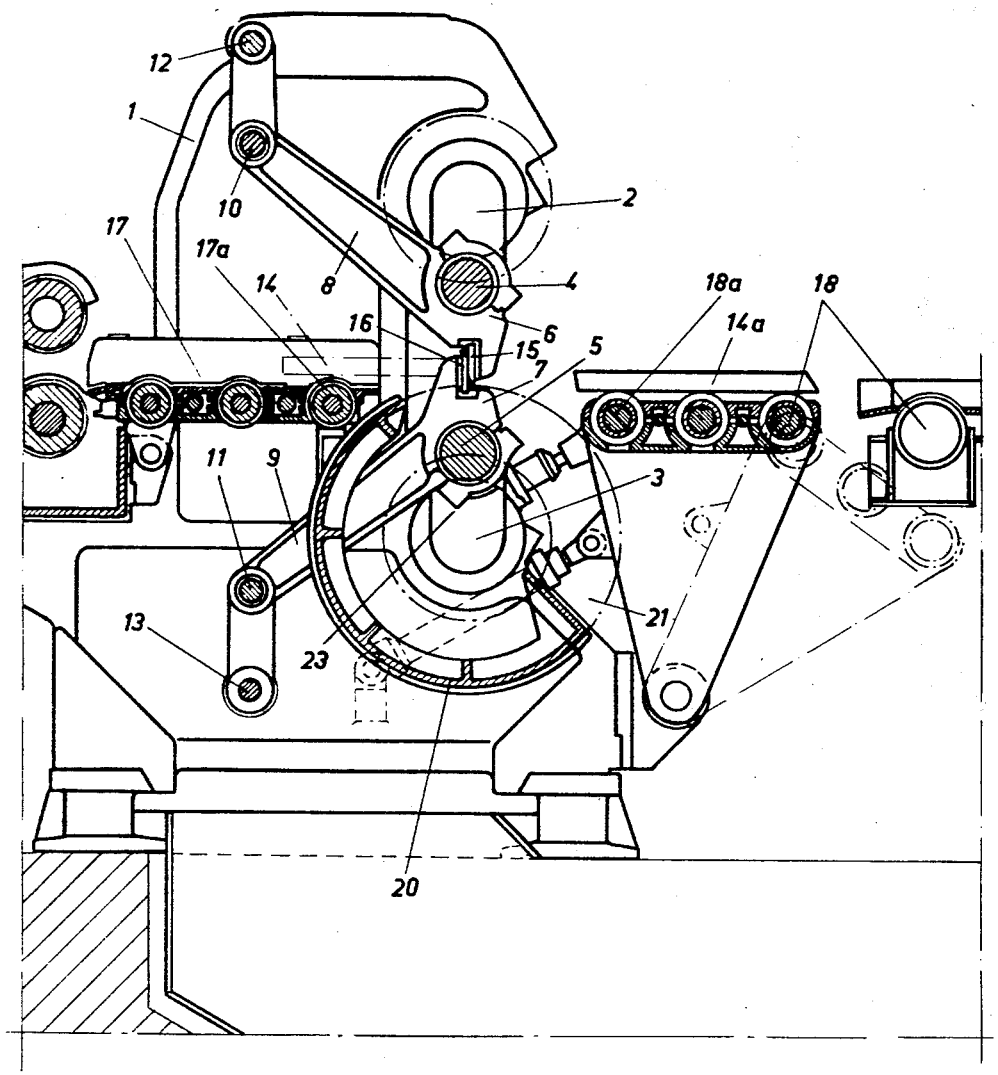
FIGURE 1 is a side elevational view, partially in vertical section, of a rotary shear incorporating the features of the present invention in which the knives are shown in their cutting positions.

As is revealed particularly in FIGURE 1, the shell cutout 21 of the drum body 20 is so provided that the closed shell portion of the drum body 20 turns directly from back of the cutter head 7 and the bottom knife 16 into the gap 19. This will make sure that also the smallest remaining pieces of rolled material can be passed through the shear without the risk of difficulties or operating disturbances.

It is clear that according to the present invention with the aid of relatively simple and uncomplicated means, a functionally fully reliable bridging of the gap between the approach roller table and the delivery roller table is possible, thereby preventing crop ends or remaining pieces from penetrating into this gap.

In accordance with the patent statutes, we have explained the principle and operation of our invention and have illustrated and described what we consider to represent the best embodiments thereof. However, we desire to have it understood that within the scope of the appended claims, the invention may be practiced otherwise than as specifically illustrated and described.

We claim:
1. In a rotary shear for cropping and subdividing moving rolled material having a pair of cooperative knives carried by counter-rotatable upper and lower knife holders, said knife holders having a first portion connected to crank pins of opposed driving crankshafts, other portions of said holders being connected to crank pins of guide crankshafts, each guide crankshaft being synchronized with one of said driving crankshafts, a shear approach table and a shear delivery table separated by an opening defined by the shearing zone of the shear for supporting and conveying the rolled material in which the adjacent ends of the tables are arranged close to the circular path of the lower knife, the improvement comprising:
   a member carried by and rotating with said driving crankshaft for the lower knife holder having a drum portion for supporting the rolled material passing through the opening between said tables, and wherein the drum has a radius corresponding to the distance between the axis of the lower driving crankshaft and the conveying plane of said tables, and
   a cutout portion arranged so that the lower knife emerges from the drum periphery into its cutting position.
2. In a rotary shear according to claim 1, wherein the drum includes a rolled material supporting surface substantially greater than the shearing zone.
3. In a rotary shear according to claim 1, wherein the drum includes a rolled material supporting surface immediately behind the knife of the lower knife holder adapted to support a succeeding portion of the rolled material immediately after shearing.
4. In a rotary shear according to claim 1, wherein the drum on one side is secured to a web formed on said lower driving crankshaft.
5. In a rotary shear according to claim 1, wherein the lower knife holder defines the one end of said cutout portion.

References Cited

UNITED STATES PATENTS

| 2,504,035 | 4/1950 | Morgan | 83—328 |
| 2,076,969 | 4/1937 | Sieger | 83—322 X |

WILLIAM S. LAWSON, *Primary Examiner.*